May 24, 1955  H. L. OLSON ET AL  2,708,870
BREAD TOASTERS
Original Filed June 10, 1950  3 Sheets-Sheet 1

INVENTORS
HENRY L. OLSON AND
ROBERT A. MILLER
BY Caswell & Lagaard
ATTORNEYS

May 24, 1955 H. L. OLSON ET AL 2,708,870
BREAD TOASTERS
Original Filed June 10, 1950 3 Sheets-Sheet 3

INVENTORS
HENRY L. OLSON AND
ROBERT A. MILLER

BY Caswell & Lagaard

ATTORNEYS

United States Patent Office 2,708,870
Patented May 24, 1955

2,708,870

BREAD TOASTERS

Henry L. Olson and Robert A. Miller, Grand Haven, Mich., assignors to Camfield Manufacturing Company, Grand Haven, Mich., a corporation of Michigan Original application June 10, 1950, Serial No. 167,418. Divided and this application September 1, 1950, Serial No. 182,818

1 Claim. (Cl. 99—391)

The herein disclosed invention relates to bread toasters and particularly to bread toasters used for simultaneously toasting two slices of bread and has for an object to provide a simple construction for connecting the bread racks of the toaster to the operating mechanism therefor.

Another object of the invention resides in providing the toaster with a frame and heating units forming two vertical bread ovens in which the bread racks are disposed and in further constructing the toaster with a space between the heating units and in which the operating mechanism is disposed and in projecting parts of the operating mechanism and parts of the bread racks outwardly beyond the toaster frame and in providing a connector attached to such parts for securing the same together in operative relation, said connector being disposed entirely outside of the frame.

An object of the invention resides in constructing the frame with first and second end frame members, the first end frame member being provided with an intermediate slot disposed opposite the intermediate space and with outer slots disposed opposite the bread ovens and in arranging said parts of the operating mechanism and bread racks to project through said slots.

A feature of the invention resides in using as the operating mechanism for the bread racks two parallel levers disposed in said intermediate space and having parts extending through the intermediate slot in the first end frame member and pivoted to the second end frame member and in forming on said connector lugs to which said parts of the levers are pivoted whereby the connector moves parallel to itself in an up and down direction, and in fixedly connecting to said connector the end parts of the bread racks.

An object of the invention resides in constructing the connector from sheet metal and in the form of a yoke, the legs of the yoke being connected to the bread racks and the intermediate portion of the yoke having the lugs to which the levers of the operating mechanism are pivoted.

A still further object of the invention resides in providing the end part of each bread rack with two oppositely facing notches therein forming on the body of the bread rack shoulders, and outwardly therefrom fingers, one of said fingers being adapted to be bent out of the plane of said bread rack and in forming said yoke with an opening terminating in a slot angularly disposed with reference to the slot in the first end wall of the frame and into which the end part of the bread rack may be inserted when said finger is bent to pass through said slot in the yoke, said finger when straightened out engaging the yoke adjacent the slot therein and holding the bread rack secured to the yoke.

Other objects of the invention reside in the novel combination and arrangement of parts and in the details of construction hereinafter illustrated and/or described.

Figure 1:
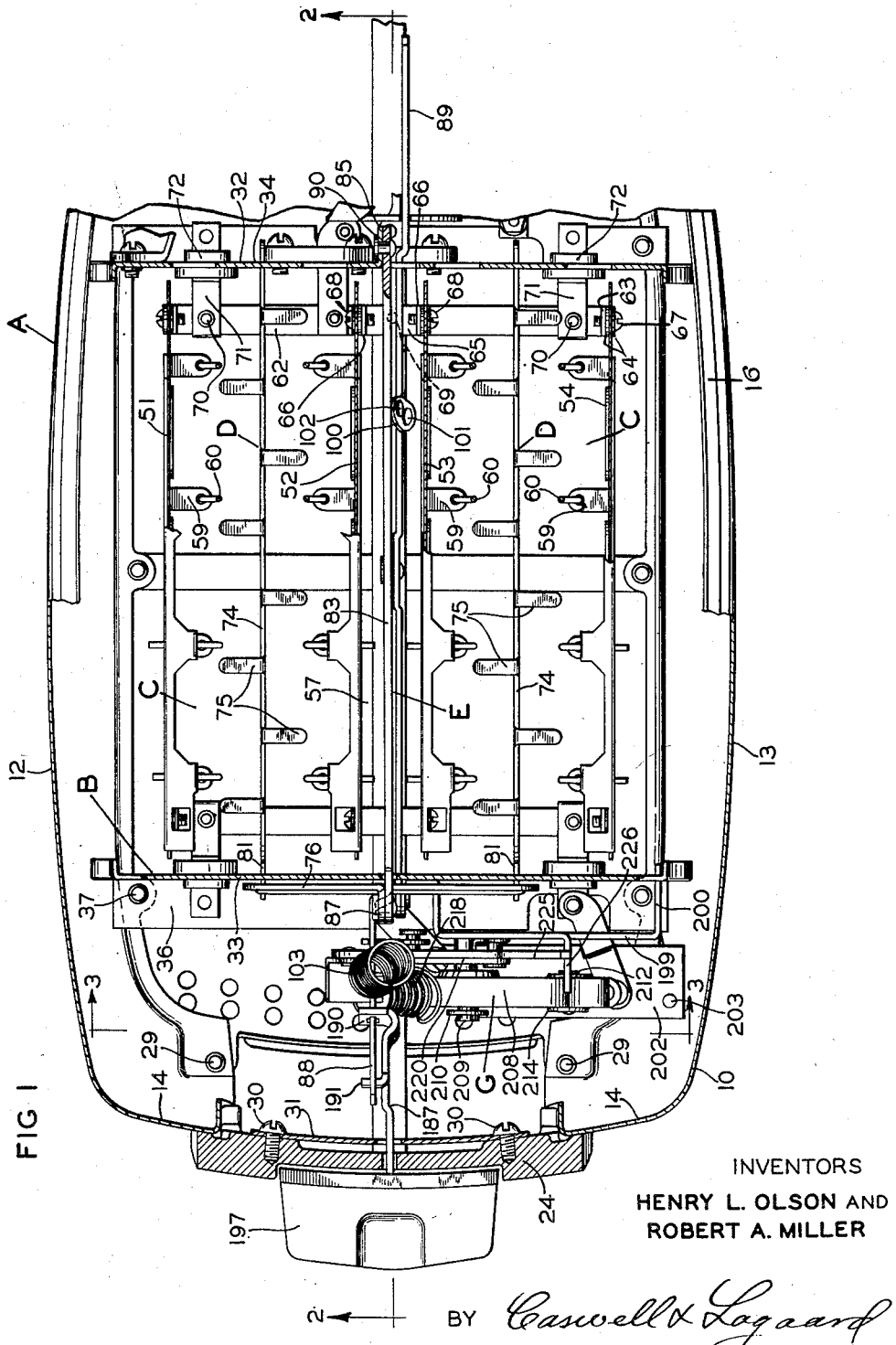
Fig. 1 is a plan sectional view of a toaster illustrating an embodiment of the invention and taken substantially on line 1—1 of Fig. 2.

This application is a division of the copending application for patent of Henry L. Olson et al., Serial No. 167,418, filed June 10, 1950.

The bread toaster disclosed herein consists of a case A in which is disposed a framework B. This framework includes two spaced end frame members. A number of heating elements disposed within the framework B form two spaced bread ovens C and provides a space therebetween. In the bread ovens C are disposed two vertical movable bread racks D which support the bread and which are spring biased to non-toasting position. These bread racks extend through one of said end frame members and are connected together exteriorly thereof through a suitable connector. For operating the bread racks, an operating mechanism E is employed which consists of two parallel levers pivoted at one end of each lever to said connector and pivoted at the other end of each lever to one of said end frame members. These levers cause parallel movement of the bread racks D within the bread ovens C. Below the said parallel levers are provided two operating levers operable from opposite ends of the toaster and connected to said parallel levers. Actuation of the toaster is procured through a timing device not shown in the drawings. This timing device controls a switch mechanism G by means of which the heating elements are energized.

Figure 2:
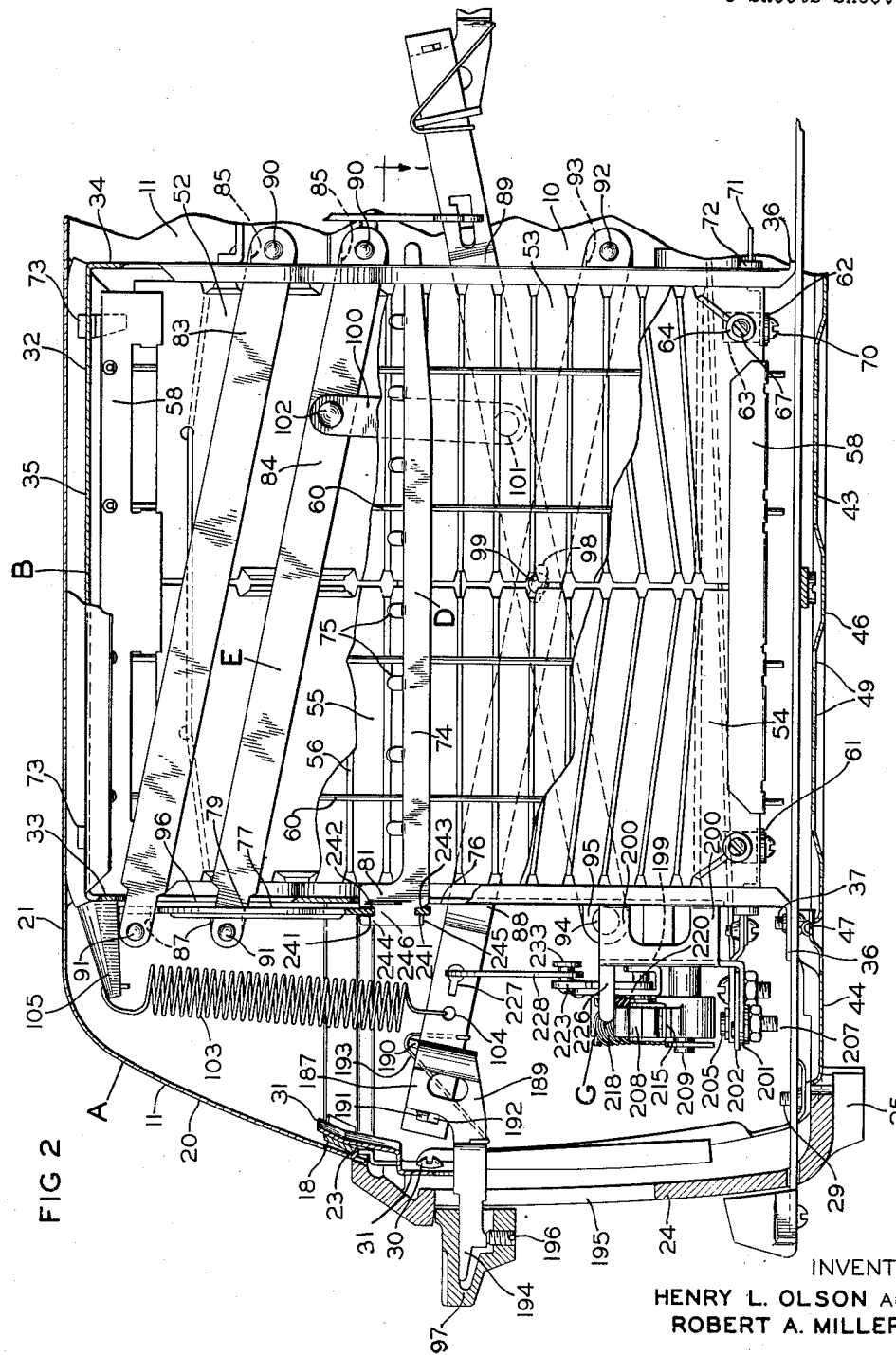
Fig. 2 is an elevational sectional view taken on line 2—2 of Fig. 1.

The case A of the invention, shown in detail in Figs. 1 and 2, consists of a lower case section 10 and an upper case section 11. Case section 10 has sides 12 and 13 and which have formed on them inwardly turned end portions 14, best shown in Fig. 1. The sides 12 and 13 and end portions 14 are formed with an offset 16 which provides a recess 17 extending about the uppermost portion of said case section. A bar 18 is secured to the offsets 16 of the end portions 14 and ties the parts of the lower case section together. This bar may be welded, brazed, or otherwise secured to the said offsets whereby the parts are securely held attached to one another. The upper case section 11 is dome-shaped in form having sides 19, ends 20 and a top 21. The lower marginal portions 22 of the upper section 11 are received in the recess 17. For holding the parts together the marginal portions 22 of the ends 20 are formed with inwardly turned lips 23 which are adapted to snap under the bars 18. The bars 18 are arranged in inclined relation so that when the upper case section is forced downward the lips 23 are sprung apart. When the said lips pass beneath the lower edges of the bars 18 the said lips again spring in position and hold the parts assembled.

For closing the ends of the lower case section 10, end pieces 24 are employed which are constructed from a plastic material. The lowermost portion of the sides 12 and 13 and the end portions 14 and 15 are turned inwardly as indicated at 26. These portions of the case section have upwardly extending flanges 27 which terminate in vertically extending flanges 45 from which issue a number of horizontally disposed ears 28. The end pieces 24 are formed with feet 25 which underlie the ears 28 of the sides 12 and 13. Screws 29 extend through these feet and are screwed into said ears. Other screws 30 extend through clips 31 mounted on the end pieces 24 and are screwed into said end pieces. These clips engage the bars 18 and hold the uppermost portions of the end pieces attached to the case proper.

Figure 3:
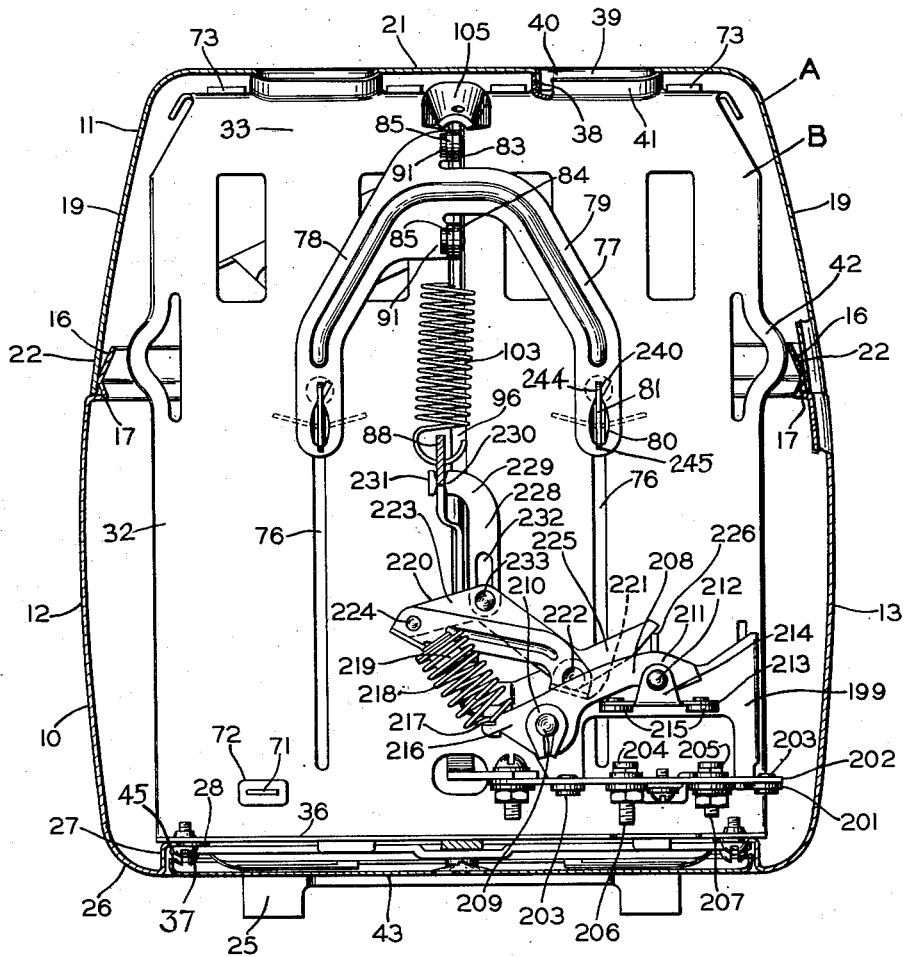
Fig. 3 is a cross sectional view taken on line 3—3 of Fig. 1.

The framework B includes a frame 32 of inverted U-shape having end frame members 33 and 34 and an upper frame member 35 connected therewith. The frame members 33 and 34 have flanges 36 which overlie certain of the ears 28. Screws 37 pass through these ears and are screwed into the flanges 36 and serve to attach the lowermost portion of the frame to the case proper. The upper frame member 35 of frame 32 has openings 38 formed therein which communicate with the bread ovens C. These openings communicate with other openings 39 in the top 21 of the upper case section 11. Depending flanges 40 formed on the top 21 of case section 11 extend downwardly into and are received in similar flanges 41 formed on the upper frame member 35 of frame B. For the purpose of centering the case A with respect to the frame 32 at the locality of the joint between the two frame sections, projections 42 are formed in the end frame members 33 and 34 and which are adapted to engage the offset 16 formed on the lower case section 10 as best shown in Fig. 3.

The lowermost portion of the toaster is closed by means of a bottom 43. This bottom consists of two end portions 44 and an intermediate closure 46. This closure 46 is hingedly connected to one end portion 44 through a hinge 47 and is detachably secured to the other end portion by means of a spring clip not shown. This closure is provided with openings 49 which give the desired amount of draft to the toaster. The end portions 44 are held attached to the case A by means of the screws 29 and 37 previously referred to.

The bread ovens C are formed by the end frame members 33 and 34 of frame 32 and by means of four heating units 51, 52, 53 and 54. These units consist of sheets of mica 55 on which are wound suitable resistors 56. The heating units 52 and 53 are separated from one another to form a space 57 therebetween and in which portions of the mechanism for operating the toaster are disposed.

The heating units 51, 52, 53 and 54 have reinforcing strips 58 secured to the same at the top and bottom thereof. These reinforcing strips have ears 59 projecting outwardly therefrom and into the bread ovens C. Guard wires 60 are attached to these ears and extend into the bread ovens C and hold the bread spaced from the heating units to prevent burning of the bread.

The heating units of the invention are supported in the following manner: Extending beneath the heating units at the ends thereof are two bars 61 and 62 which are constructed and supported in the same manner. Only the bar 62 will be described in detail. This bar has upstanding flanges 63 at the ends of the same and which are threaded to receive screws 67. The screws 67 pass through the sheets of mica 55 and are screwed into the said flanges. Washers 64 disposed on each side of the mica serve the usual purpose. In the center of the bar 62 is a channel-shaped support 65 which has flanges 66 similar to the flanges 63 extending upwardly therefrom. Screws 68 similar to the screws 67 extend through the sheets of mica 55 of the heating elements 52 and 53 and attach the same to the bar 62. The support 65 is attached to the bar 62 by means of a screw 69 which extends through said bar and is screwed into the support 65. The bars 62 have attached to them by means of screws 70, arms 71 which project through insulators 72, mounted in the end frame members 33 and 34. The upper ends of the heating elements 51, 52, 53 and 54 are held in place by means of insulators 73 which are mounted in the upper frame member 35.

The bread racks D are used in supporting the bread within the bread ovens C and are both identical in construction. These bread racks are each constructed from a bar 74 of metal having lugs 75 projecting outwardly therefrom, the alternating lugs extending in opposite directions. The said bars extend through slots 76 in the end frame members 33 and 34. For supporting the said bread racks the following construction is employed: Disposed exteriorly of the end frame member 34 is a yoke or connector 77 of metal having two arms 78 and 79 and a connecting portion 250 therebetween. Along the said arms and connecting portion is formed a rib 251 which stiffens and reinforces the same. These arms have vertically extending openings 80 in the same. At the upper ends of said openings are formed slots 240 which make an angle with said openings as best shown in Fig. 3. These slots are of substantially the same width as the thickness of the metal from which the bread racks D are constructed. The end 81 of each of the bars 74 of the bread racks D is constructed with oppositely facing notches 241 forming shoulders 242 and 243 on the bar 74 and fingers 244 and 245 disposed outwardly therefrom. The finger 244 is normally bent to lie in the plane of the slot 240 of the arm of the yoke 77 and the shoulder 243 is somewhat inclined to permit of inserting the end of the bar 74 into the opening 80 and the slot 240. When the parts are assembled a neck 246 formed on the end 81 of bar 74 is received in the opening 80 and the shoulders 242 and 243 butt up against the inner surface of the yoke 77. The finger 245 overlies the outer surface of said yoke and by straightening up the finger the same is caused to overlie the portion of said yoke to the left of the slot 240 as viewed in Fig. 3. With the parts disposed as shown in Figs. 1 and 3 the bread racks D become securely attached to the yoke 77.

The operating mechanism E of the invention includes two parallel levers 83 and 84. These levers are pivoted by means of rivets 90 to lugs 85 best shown in Fig. 2. These lugs are formed by striking the metal out of the end frame member 34 to leave openings in said end frame member and through which the levers 83 and 84 extend. The other ends of said levers extend through a slot 96 in end frame member 33 and are pivoted by means of rivets 91 to lugs 87 formed on the yoke 77 and disposed one below and one above the rib 251. By means of this construction the two bread racks D are guided for up and down movement upon swinging of the levers 83 and 84 and during such movement maintained in horizontal position.

The operating mechanism E further includes two crossed operating levers 88 and 89. The lever 88 is pivoted by means of a rivet 92 to a lug 93 formed on the end frame member 34. The other lever 89 is pivoted by means of a rivet 94 to a lug 95 formed on the end frame member 33. The two levers 88 and 89 and the levers 83 and 84 are guided for vertical movement in the vertical slot 96 formed in the end frame member 33 while the lever 89 is similarly guided in the end frame member 34. The lever 88 has a slot 98 in the same extending longitudinally thereof and located at the portion of the same where the lever 89 crosses the lever 88. Attached to the lever 89 is a pintle 99 which is received in the slot 98. It will readily be comprehended that by means of this construction the two levers are caused to move in unison and upon the depressing of either of said levers the other lever moves with it and in the same direction. The lever 89 is connected by means of a rivet 101 to a link 100. Link 100 is connected by means of a rivet 102 to the lever 84. It will be noted that the rivet 102 is disposed intermediate the center of the lever 84 and the pivot 90 while the rivet 101 is disposed intermediate the pintle 99 and the free end of the lever 89. By means of this construction a lever advantage is gained so that the levers 83 and 84 together with the bread racks D travel a greater distance than the ends of the levers 88 and 89.

The operating mechanism is urged to move the bread racks D into non-toasting position. This is accomplished by means of a tension coil spring 103 which is hooked into a hole 104 in the lever 88 and which is further hooked on a bracket 105 attached to and issuing outwardly from the end frame member 33.

Control of the movement of bread racks D is procured through a timing mechanism such as disclosed in the patent to R. Sardeson No. 2,365,909, issued December 26, 1944. Inasmuch as the said timing mechanism does not form any particular feature of the instant invention, the same has not been illustrated or described in this application. It might be stated, however, that when either of the levers 88 and 89 are depressed, in opposition to the spring 103 that the bread racks D are lowered and that lever 89 is engaged by the timing mechanism and held in such position thereby during the toasting period to be subsequently released upon termination of the toasting period.

For operating the levers 88 and 89 two extensions 187 on the ends of these levers are employed. The extension shown in conjunction with lever 88 consists of a body 189 which overlies the outermost end of said lever. This body has a flange 190 extending at right angles to the body and formed with a hole not shown in the drawings and through which the lever 88 extends. The said body has a finger 191 which extends through a vertical slot 192 in the outermost end of said lever. A looped wire spring 193 extends about the flange 190 and is hooked under the lever 88 and also under the body 189. This spring urges the fingers 191 to the upper end of the slot 192. The extension 187 has a bar 194 issuing outwardly therefrom and which extends through a vertical slot 195 in the end piece 24. Mounted on the end of the bar 194 is a knob 197. A set screw 196 holds the said knob attached to the bar. The purpose of the extension 187 is to compensate for various irregularities in the manufacture of the toaster.

The switch mechanism G of the invention is best shown in Figs. 2 and 3. This switch mechanism includes a support 199 which is stamped from sheet metal and which has legs 200 projecting outwardly therefrom. These legs are attached to the end frame member 33 and hold the support 199 spaced from said end frame member. The lowermost part of this support 199 has flanges 201 projecting outwardly therefrom and which have attached to them a bar 202 of insulating material. Rivets 203 extend through these parts and hold the same attached. This bar of insulating material carries two fixed contacts 204 and 205 which are mounted on screws 206 and 207 which are secured to said bar. These contacts are connected in the circuit for the heating units 51, 52, 53 and 54 in the usual manner. The contacts 204 and 205 lie in a substantially horizontal plane. Pivoted to the support 199 is a switch lever 208 constructed of insulating material. This lever is mounted on a stud 209 secured to the support 199 and which forms the pivot means therefor. A clip 210 attached to the end of this stud holds the said lever in position thereon. The lever 208 has a long arm 211 which has been referred to as a contact carrying arm and which has pivoted to it by means of a rivet 212 a swinging contact bar 213. This bar has ears 214 extending upwardly therefrom and through which the rivet 212 extends. The said contact bar is also formed with movable contacts 215 which when the lever 208 is swung in a clockwise direction engage the contacts 204 and 205 and closes the circuit through the same. The lever 208 has at its other end a short arm 216 which will be referred to as an actuating arm and which is formed with a slot 217. In this slot is received one end of a compression coil spring 218, the other end of which encircles a lug 219 formed on an arm 220. The end of arm 216 adjacent said slot and lug 219 will be referred to as spring engaging members. Arm 220 is formed at its end opposite the lug 219 with a U-shaped portion 221. A stud 222 extends through this portion and is attached to the support 199. By means of this construction the arm 220 is held from twisting even though the lug 219 is offset from said arm. Disposed adjacent the arm 220 is a companion arm 223 which is attached at one end to the arm 220 by means of a rivet 224. This arm is straddled by the U-shaped portion 221 of arm 220 and the stud 222 passes through this arm as well as said U-shaped portion. The arm 223 hence travels in unison with the arm 220. On the arm 223 is formed a finger 225 which extends outwardly therefrom and which is adapted to engage the upper surface of a stop 226. This finger limits upward movement of the end of the lever to which spring 218 is attached. The stop 226 is so situated that the upper surface of the switch lever 208 strikes the lower surface of this stop. In this manner the upward movement of the contact bar 213 is terminated. The stop 226 is struck out from the support 199 and is situated near the upper portion of the same.

The switch mechanism G is operated by the lever 88. This lever has formed in it a key hole 227. A link 228 is pivoted to said lever through this hole. For the purpose, the said link at its upper end has an offset 229 which is formed with a neck 230 and with a head 231 at its outer end. The head 231 is insertable into the slot 227 by holding said link horizontal and when turned to a vertical position the neck 230 becomes seated in the circular part of said slot and is pivotally attached to said lever. The lower end of the link has formed in it a slot 232. A stud 233 passes through this slot and is secured to the companion arm 223. This slot provides a lost motion connection between the toaster operating lever and switch mechanism whereby the toaster is not energized until said lever approaches its lowermost position.

The operation of the invention is obvious. As the lever 88 is depressed link 100 draws the lever 84 downwardly. Said lever being pivoted to the frame member 34 and to the yoke 77 moves said yoke downwardly. The lever 83 maintains the yoke 77 in a vertical position in its descent. The bread racks D being secured to the arms 78 and 79 of said yoke are also moved with it and remain horizontal throughout their movement. Upon release of the lever 88 spring 103 moves the bread racks upwardly to their uppermost positions.

The advantages of the invention are manifest. The parts are easily constructed and utilize a minimum amount of material. Assembly of the parts is easy and the bread racks are secured to the yoke by simply hooking the ends of the same into the openings in the arms of the yoke and straightening the bent ear thereof.

What is claimed to be new and desired to be protected by Letters Patent is:

In a bread toaster, a frame having a first end frame member and a second end frame member spaced therefrom, heating units in said frame forming with said end frame members two vertical bread ovens and a vertical intermediate space therebetween, said first end frame member having two outer vertical slots disposed adjacent said bread ovens and an intermediate vertical slot disposed adjacent said space, two bread racks disposed one in each bread oven and having vertically disposed sheet metal end parts extending through said outer slots, operating mechanism for the bread racks including two levers disposed in said space and having end parts projecting through said intermediate slot, the other ends of said levers being pivoted to said second end frame member of the frame, a connector for said parts lying outwardly of said first end frame member and having lugs intermediate its end and to which said end parts of the levers are pivoted, said connector being formed with openings disposed opposite and extending along the outer slots in the first end frame member, the openings in said connector terminating at their upper ends in slots extending angularly with respect to said openings in the connector, the end part of each of said bread racks being constructed with oppositely facing upper and lower notches forming shoulders on the body of the bread rack and fingers spaced from said shoulders together with a neck between said notches, the upper finger of said end part extending angularly with reference to said end part to register with the slot in said connector, the lower notch in said end portion being divergent to facilitate insertion of the end part into the opening in the connector, said upper finger being bendable to bring said finger in alignment with the neck and lower finger of said end part to hold the bread rack attached to the connector.

References Cited in the file of this patent

UNITED STATES PATENTS

| | | |
|---|---|---|
| 1,931,450 | Warner | Oct. 17, 1933 |
| 2,091,041 | Hallwood | Aug. 24, 1937 |
| 2,106,824 | Bayne | Feb. 1, 1938 |
| 2,133,583 | Smith | Oct. 18, 1938 |
| 2,260,043 | Midleton et al. | Oct. 21, 1941 |
| 2,266,045 | Ireland | Dec. 16, 1941 |
| 2,288,699 | Gomersall et al. | July 7, 1942 |
| 2,336,640 | Sardeson | Dec. 14, 1943 |
| 2,365,909 | Sardeson | Dec. 26, 1944 |
| 2,389,927 | Parr | Nov. 27, 1945 |
| 2,542,231 | Campbell | Feb. 20, 1951 |

FOREIGN PATENTS

| | | |
|---|---|---|
| 176,587 | Great Britain | Mar. 16, 1922 |